Sept. 8, 1970  M. A. LEE  3,527,364

INDEXING MECHANISMS

Filed Jan. 27, 1969  2 Sheets-Sheet 1

INVENTOR
MICHAEL A. LEE

BY *Kirschstein, Kirschstein & Ottinger*
ATTORNEYS

Sept. 8, 1970     M. A. LEE     3,527,364
INDEXING MECHANISMS
Filed Jan. 27, 1969     2 Sheets-Sheet 2
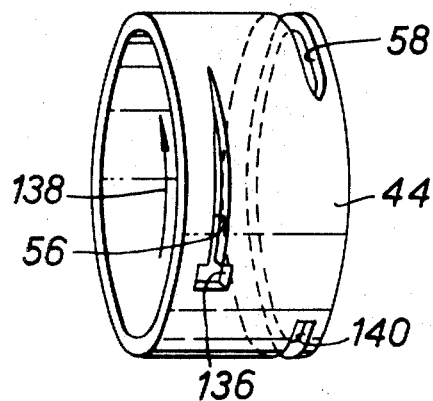
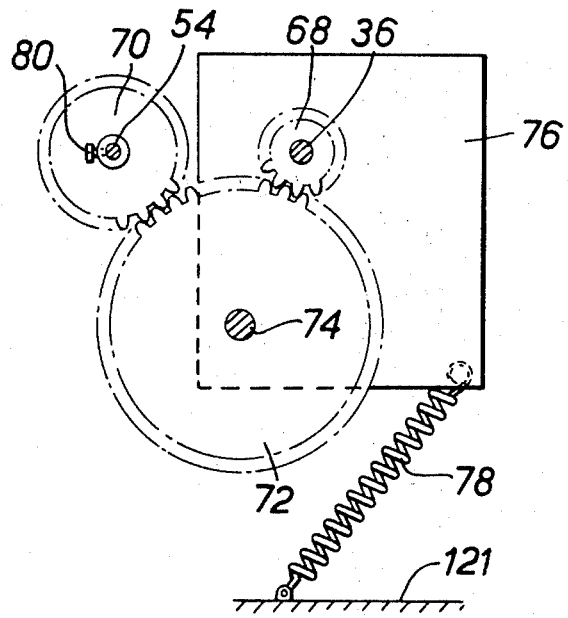
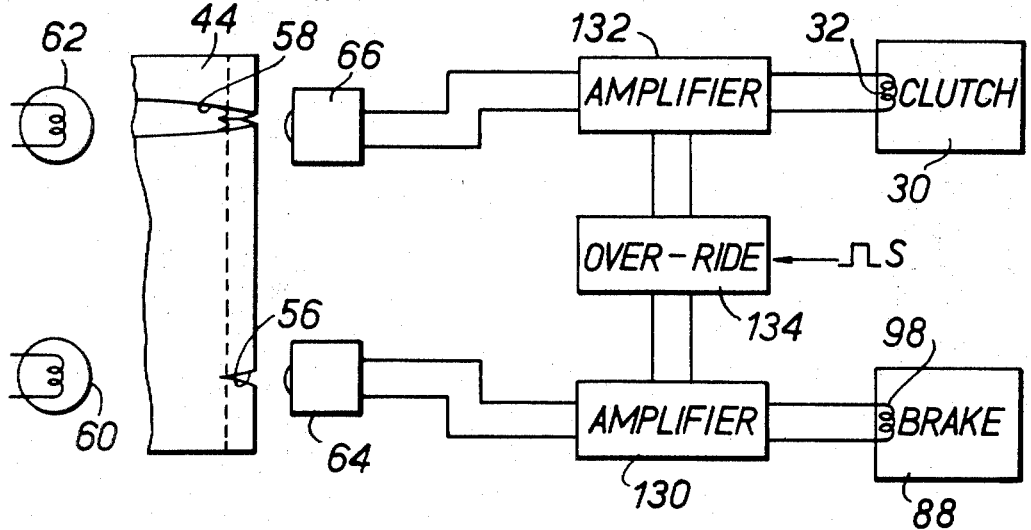
INVENTOR
MICHAEL A. LEE
BY *Kirschstein, Kirschstein & Ottinger*
ATTORNEYS United States Patent Office 3,527,364
Patented Sept. 8, 1970

3,527,364
INDEXING MECHANISMS
Michael A. Lee, 8 W. Close, Greenford,
Middlesex, England
Filed Jan. 27, 1969, Ser. No. 793,977
Claims priority, application Great Britain, Feb. 5, 1968,
5,632/68
Int. Cl. F16h 27/04
U.S. Cl. 214—1                                    16 Claims

ABSTRACT OF THE DISCLOSURE

An indexing mechanism for linearly moving a workpiece in a series of equal steps includes a rotatable shaft on which is secured a first gear wheel of a gear train. A drum is coupled to a second gear wheel of the gear train for rotation therewith, the drum carrying a reference marking which is sensed by sensing means fixed in position relative to the axis of the second gear wheel. The mechanism includes drive means for rotating said shaft, and control means adapted to stop the rotation of said shaft, in response to the sensing of the reference marking, upon the second gear wheel reaching a predetermined angular position relative to the sensing means. A micrometer head mechanism connects said shaft to a linearly movable actuating member for moving the workpiece, whereby rotational movement of said shaft is converted into linear movement of the actuating member. In operation of the indexing mechanism, the second gear wheel undergoes a series of intermittent single complete revolutions each corresponding to a predetermined linear movement of the actuating member; the second gear wheel is readily replaceable by a further gear wheel having a different number of teeth so that the amount of each stepping movement of the workpiece can be varied.

---

This invention relates to indexing mechanisms for linearly moving a workpiece in a series of steps.

Hitherto, great difficulty has been experienced in controlling the operation of indexing mechanisms of this type to bring about movement of the workpiece in accurately constant predetermined steps. For example, a known indexing mechanism of this type includes a motor arranged to drive a lead-screw which is connected to a linearly movable actuating member for the workpiece in such a manner that a predetermined angular rotation of the lead-screw corresponds to a predetermined linear movement of the actuating member, and operation of the mechanism is brought about by intermittently running the motor for a plurality of fixed times intervals; with this known mechanism, it is extremely difficult to control the rotation of the motor armature sufficiently accurately to ensure that each stepping of the workpiece accurately corresponds to a predetermined distance of travel, and a cumulative error develops.

It is accordingly an object of the present invention to provide an indexing mechanism for linearly moving a workpiece in a series of steps wherein the difficulty referred to above is alleviated.

According to the invention, an indexing mechanism for linearly moving a workpiece in a series of steps includes a rotatable shaft on which is secured a first gear wheel forming part of a gear train, drive means for rotating said shaft, control means including sensing means which is adapted to sense a reference marking formed on a second gear wheel of said gear train or on a member coupled to the second gear wheel for rotation therewith, and which is fixed relative to the axis of the second gear wheel, said control means being adapted to stop the rotation of said shaft, in response to the sensing of said reference marking, upon the second gear wheel reaching a predetermined angular position relative to said sensing means, a linearly movable actuating member for moving the workpiece, and means adapted to convert rotational movement of said shaft into linear movement of said actuating member, the arrangement being such that, in operation, the second gear wheel is adapted to undergo intermittent single complete revolutions each corresponding to a predetermined linear movement of said actuating member.

An embodiment of the invention will now be described by way of example with reference to the accompanying drawings, in which:

FIG. 2 is a perspective view, shown on an enlarged scale, of a rotatable drum incorporated in the mechanism of FIG. 1;

FIG. 3 is a side elevation, shown on an enlarged scale, of a gear train incorporated in the mechanism of FIG. 1; and FIG. 4 is a part schematic and part block circuit diagram of the control means for controlling the stopping and starting of the mechanism.

Figure 1:
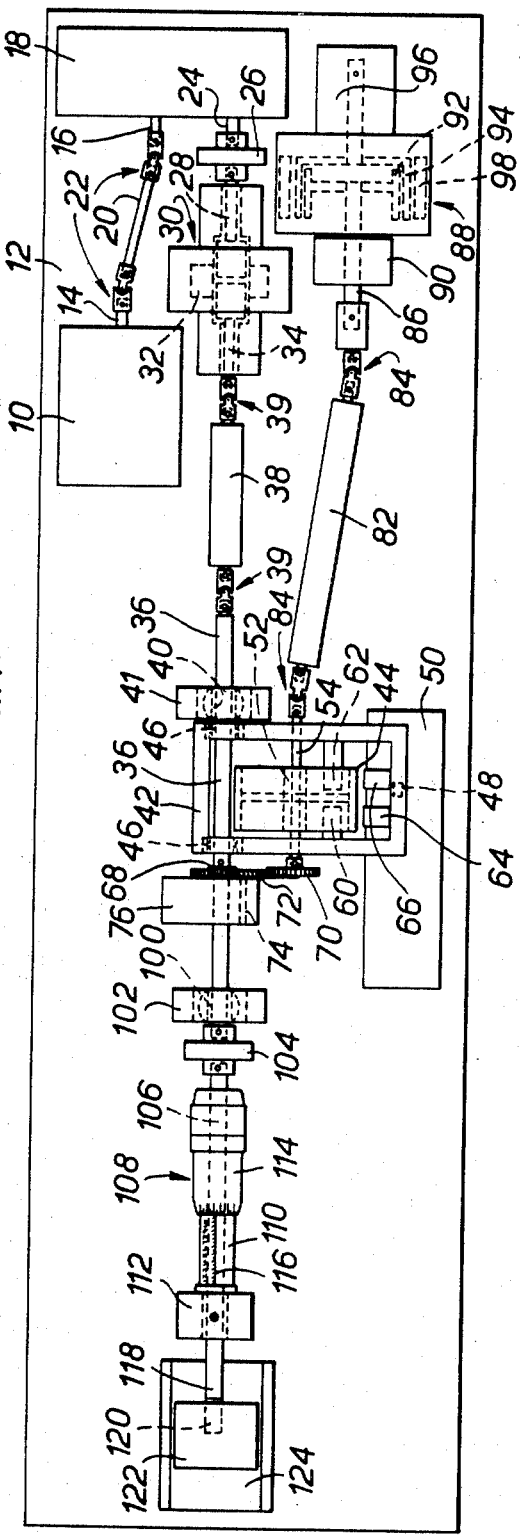
FIG. 1 is a plan view of an indexing mechanism suitable for very accurately positioning a movable support stage for semiconductor devices during the testing of such devices.

Referring to FIG. 1, the indexing mechanism includes a continuously operating electric motor 10 mounted on a base 12. The output shaft 14 of the motor 10 is connected to the input shaft 16 of a gearbox 18 via a connecting rod 20 and a pair of universal joints 22. The output shaft 24 of the gearbox 18 continuously rotates at a reduced speed compared with the output shaft 14 of the motor 10 and is connected via a universal joint 26 to the input shaft 28 of a magnetic clutch 30, the purpose of the universal joint being to allow for any angular or lateral misalignment between the axis of the shafts 24 and 28.

The clutch 30 includes a solenoid 32, and the clutch 30 is so designed that, when the solenoid 32 is energized, the output shaft 34 of the clutch 30 is coupled to the input shaft 28 for rotation therewith and that, when the solenoid is de-energized, the output shaft 34 is disconnected from the input shaft 28. The output shaft 34 of the clutch 30 is coupled to a rotatable shaft 36 via a spline shaft 38 and a pair of universal joints 39; the function of the spline shaft is to permit longitudinal movement of the rotatable shaft 36 relative to the output shaft 34 of the clutch 30 while ensuring that the shaft 36 rotates together with the shaft 34.

The shaft 36 passes through, and is supported by, a bearing 40 mounted in a vertically extending fixed support 41 the lower end of which is securd to the base 12. A support frame 42 for a rotatable drum 44 is rotatably mounted on the shaft 36 by means of a pair of bearings 46 which permit rotation of the frame 42 about the axis of the shaft 36 but prevent any movement of the frame 42 along the shaft 436. The upper end of a vertically extending bearing post 48 is secured to that part of the frame 42 remote from the shaft 36, the lower end of the post 48 which is provided with a ball bearing mounted roller means (not shown) running on the upper surface of a horizontal bearing plate 50 mounted on the base 12. It should be understood that the shaft 36 can move longitudinally, relative to the support 40, carrying with it the assembly of the frame 42 and the drum 44, the lower end of the bearing post 48 rolling over the upper surface of the bearing plate 50. As shown in FIG. 1, the assembly of the shaft 36, frame 42 and drum 44 is in its rightmost position with the frame 42 abutting against the support 40.

The drum 44 which is opaque is rotatably mounted by means of a hub assembly 52 on a spindle 54 carried by the frame 42. Referring now to FIG. 2, the dum 44 has formed therein two slots 56 and 58 each of which extends around part of the circumference of the drum 44; for the sake of clarity the slots 56 and 58 are not shown in FIG. 1. The slots 56 and 58 are respectively associated with two lamps 60 and 62 (see FIGS. 1 and 4) located inside the drum 44 but mounted on the frame 42, and are also respectively associated with two photocells 64 and 66 which are located outside the drum 44 and are supported on the inside of the frame 42. As is clearly shown in FIG. 4, the slot 56 is aligned with the lamp 60 and the photocell 64 in such a manner that, when during rotation of the drum 44 a portion of the slot 56 is disposed between the lamp 60 and photocell 64, the photocell 64 is energized by light from the lamp 60 passing through the slot 56. Similarly, the slot 58 is aligned with the lamp 62 and the photocell 66 in such a manner that, when a portion of the slot 58 is disposed between the lamp 62 and the photocell 66, the photocell is energized by light from the lamp 62 passing through the slot 58. The photocells 64 and 66 are highly directional such that neither of the photocells is significantly affected by light from the lamp associated with the other photocell or by light from any extraneous source. The function of the slots 56 and 58, which consitute a reference marking on the drum 44, the lamps 60 and 62 and the photocells 64 and 66, which constitute a sensing means for the reference marking, will be explained later. It should be understood that in an alternative arrangement the reference marking could be formed directly on the second gear wheel 70, in which case the drum 44 could be dispensed with and a modified sensing means provided.

Referring now to FIGS. 1 and 3, the indexing mechanism includes a gear train consisting of a first gear wheel 68 secured on the rotatable shaft 36, a second gear wheel 70 secured on one end of the spindle 54, and an intermediate gear wheel 72 which couples together the gear wheels 68 and 70 and which is mounted on a spindle 74 carried on a block 76. The block 76 is rotatably mounted on the shaft 36 and is connected by means of a tension spring to a portion 121 of the frame 42 in such a manner as to resiliently urge the intermediate gear wheel 72 into co-operation with the second gear wheel 70. The second gear wheel 70 is removably secured to the spindle 54 by means of a setscrew 80. Thus, if desired, the second gear wheel 72 can be readily replaced by another gear wheel having a different number of teeth the intermediate gear wheel 72 being pivoted out of the way against the tension of the spring 78 while the second gear wheel 70 is being replaced. It will be appreciated that the fact that the intermediate gear wheel 72 is resiliently urged against the second gear wheel 70 makes it possible to replace the second gear wheel 70 by a gear wheel of a different diameter. If desired, the block 76 can be in the form of a split block provided with means for adjusting the spacing between the axes of the gear wheels 68 and 72.

Referring again to FIG. 1, that end of the spindle 54 remote from the second gear wheel 70 is coupled via a spline shaft 82 and a pair of universal joints 84 to a rotatable shaft 86 forming part of an electromagnetic brake 88. The shaft 86 is rotatably mounted in a support 90, secured to the base 12, in such a manner that no longitudinal movement of the shaft 86 relative to the support 90 is permitted. The brake 88 includes a rotatable inner cylinder 92 secured to the shaft 86, and a fixed outer cylinder 94 which surrounds the cylinder 92 and which is secured to a further support 96 fixed to the base 12. A solenoid 98 surrounds the outer cylinder 94. The space between the inner and outer cylinders 92 and 94 is filled with magnetizable particles (not shown), and the arrangement is such that upon the solenoid 98 being energized these particles are magnetized and act in known manner to apply a braking force to the inner cylinder 92, the magnitude of this braking force being dependent upon the magnitude of the energizing current for the solenoid 98. When the solenoid 98 is not energized the inner cylinder 92 can rotate freely inside the outer cylinder 94.

That end of the rotatable shaft 36 remote from the spline shaft 38 passes through, and is supported by, a bearing 100 mounted in a vertically extending fixed support 102 the lower end of which is secured to the base 12, this end of the shaft 36 being connected via a universal joint 104 to a lead-screw 106 of a micrometer head 108. The lead-screw 106 engages in, and passes through, an internally threaded, horizontally extending barrel 110 one end of which is secured to a vertically extending support 112 fixed to the base 12. The lead-screw 106 is coaxially surrounded by a thimble 114 the closed end of which is adjacent the universal joint 104 and is secured to the lead-screw 106. The open end of the thimble 114 fits around the barrel 110 with a small air gap therebetween, the periphery of this end being marked in graduations which, in conjunction with a longitudinal reference line 116 and graduations marked on the outside of the barrel 110, enable the longitudinal distance of any travel of the lead-screw 106 to be read off in the manner of a conventional micrometer. That end of the lead-screw 106 remote from the universal joint 104 is formed integral with an actuating rod 118 which passes through an aperture in the support 112. The free end of the rod 118 bears against one end of a permanent magnet 120 set into a movable stage 122 on which may be mounted a semiconductor wafer (not shown) which is to undergo a testing operation, the wafer incorporating a plurality of integrated circuits spaced linearly apart at accurately constant intervals in the direction of movement of the movable stage 122. The movable stage 122 (which constitutes a workpiece for the indexing mechanism) is slidably mounted on a fixed support member 124 in such a manner as to be movable in a horizontal plane parallel to the axis of the actuating rod 118. The end of the rod 118 which bears against the magnet is flat and smooth and accurately perpendicular to the axis of the rod 118, and the arrangement is such that the movable stage 122 is coupled by magnetic attraction to the rod 118 for longitudinal movement therewith while rotational movement of the rod 118 relative to the stage 122 is permitted by virtue of the smooth bearing surfaces of the rod 118 and magnet 120.

It will be appreciated that the micrometer head 108 constitutes a means for converting the rotational movement of the rotatable shaft 36 into longitudinal movement of the actuating rod 118 and movable stage 122, since rotation of the lead-screw 106 inside the internally threaded barrel 110 brings about relative longitudinal movement between the lead-screw 106 and barrel 110. It will further be appreciated that rotation of the shaft 36 brings about movement generally in a direction parallel to the axis of the shaft 36 of the whole of the assembly of the shaft 36, the frame 42 and drum 44, the gear wheels 68, 70 and 72, the block 76, the universal joint 104, the lead-screw 106 and thimble 114, and the actuating rod 118, this movement which is relative to the base 12 being permitted by virtue of the provision of the spline shafts 38 and 82.

Referring again to FIG. 4, the photocell 64 is connected via an amplifier 130 to the solenoid 98 of the brake 88, while the photocell 66 is connected via an amplifier 132 to the solenoid 32 of the clutch 30. An over-ride circuit 134 is connected to each of the amplifiers 130 and 132, the purpose of the over-ride circuit 134 being as follows. When the drum 44 is in its rest position, an enlarged portion 136 (see FIG. 2) of the slot 56 is aligned with the lamp 60 and photocell 64 so that the brake solenoid 98 is energized and the brake 88 therefore engaged, while no part of the slot 58 is aligned with the lamp 62 and photocell 66 so that the clutch solenoid 32 is not energized and the clutch 30 is therefore disengaged. Thus, in order to cause the drum 44 to be rotated in the sense indicated by the arrow 138 in FIG. 2 from its rest position via the shaft 36 and gear train 68, 70, 72, it is necessary to simultaneously de-energize the solenoid 98 and energize the solenoid 32 for a brief period under the control of the over-ride circuit 134 until the drum 44 has rotated into a position in which the leading portion 140 (see FIG. 2) of the slot 58 is aligned with the lamp 62 and photocell 66, while the portion 136 of the slot 56 has moved out of alignment with the lamp 60 and photocell 64. When this position of the drum 44 is reached, the over-ride circuit 134 is rendered inoperative, while the photocell 66 becomes energized and takes over the control of the amplifier 132 for producing an energizing current for the clutch solenoid 32, the photocell 64 being now de-energized so that the brake solenoid 98 remains de-energized. The drum 44 continues to rotate until it returns to its home position at which point it stops, the brake solenoid 98 being now fully energized and the clutch solenoid 32 being de-energized.

The over-ride circuit 134 is arranged to be rendered operative by a start pulse S, this pulse being applied to the over-ride circuit 134 from an external test circuit (not shown) which controls the testing of each integrated circuit incorporated in the wafer mounted in operation on the movable stage 122.

The principle on which the indexing mechanism operates is that the second gear wheel 70 and associated drum 44 undergo in operation a series of intermittent single, complete ravolutions, each such revolution corresponding to a predetermined linear movement of the actuating rod 118 and movable stage 122. Thus, if, for example, the lead-screw 106 has 40 turns per inch then one revolution of the first gear wheel 68 (which corresponds to one revolution of the shaft 36) in the appropriate sense advances the rod 118 by 0.025 inch. If, in addition, the first gear wheel 68 has 50 teeth and the second gear wheel 70 has N teeth, then one revolution of the second gear wheel 70 in the appropriate sense advances the rod 118 by $N/50 \times 0.025$ inch, that is to say by $N/2$ thousandths of an inch. As mentioned above, the second gear wheel 70 is readily replaceable by another gear wheel having a different number of teeth N, and it will be appreciated, therefore, that the stepping movement of the rod 118 and movable stage 122 is adjustable in increments of ½ thousandth of an inch.

The operation of the indexing mechanism will now be described. When the assembly of the rotatable shaft 36, the gear wheels 68, 70, 72 and the drum 44 is at rest, the second gear wheel 70 is in a predetermined angular position relative to the sensing means constituted by the photocells 64 and 66. It will be recalled that when the drum 44 is in its rest position the enlarged portion 136 of the slot 56 is aligned with the lamp 60 and photocell 64 so that the brake solenoid 98 is energized and the brake 88 therefore engaged, the clutch solenoid 32 at this time being in a non-energized condition and the clutch 30 therefore disengaged.

In order to initiate a stepping movement of the movable stage 122, a start pulse S is applied to the over-ride circuit 134 from the external test circuit, the start pulse S serving to cause the over-ride circuit 134 to apply a cut-off pulse to the amplifier 130 so as to de-energize the brake solenoid 98 and to apply a switch-on pulse to the amplifier 132 so as to energize the clutch solenoid 32. Thus, upon the start pulse S being applied to the over-ride circuit 134, the output shaft 34 of the clutch is coupled to the continuously rotating input shaft 28 for rotation therewith, rotation of the shaft 34 being transmitted to the drum 44 via the spline shaft 38 and universal joints 39, the rotatable shaft 36, and the gear train 68, 70, 72. As has been explained previously, rotation of the shaft 36 brings about linear movement of the movable stage 122, this movement commencing upon the start pulse S being applied to the over-ride circuit 134.

The start pulse S persists until the drum 44 has rotated into a position in which the leading portion 140 of the slot 58 is aligned with the lamp 62 and photocell 66, at which time the start pulse S ends thereby rendering the over-ride circuit 134 inoperative, while the photocell 66 becomes energized and maintains the amplifier 132 in a switched-on condition, thereby maintaining the energizing current for the clutch solenoid 32; at this time the slot 56 is no longer in alignment with the lamp 60 and photocell 64 so that the photocell 64 has become de-energized and the brake solenoid 98 remains de-energized. The clutch 30 remains in engagement until the trailing end of the slot 58 moves out of alignment with the lamp 62 and photocell at which time the clutch solenoid 32 is de-energized, thereby disengaging the clutch 30, while the leading end of the slot 56 has moved into alignment with the lamp 60 and photocell 64 thereby energizing the brake solenoid 98. After the clutch 30 has become disengaged, the assembly of the shaft 36, gear train 68, 70, 72 and drum 44, etc. continues to rotate by virtue of the inertia of the system but gradually slows down under the braking action applied by the brake 88, this braking action being applied to the spindle 54 on which the drum 44 is mounted via the spline shaft 82. The assembly continues to slow down until the enlarged portion 136 of the slot 56 moves into alignment with the lamp 60 and photocell 64 whereupon the energizing current applied to the brake solenoid 98 is suddenly increased, thereby suddenly increasing the braking action applied by the brake 88 and bringing the drum 44 and the rest of the rotatable assembly to an abrupt stop in their rest position.

It will be appreciated that the second gear wheel 70 has undergone a single complete revolution, and that the whole of the assembly of the actuating rod 118, lead-screw 106, shaft 36, gear train 68, 70, 72 and drum 44 has undergone a translational movement by a predetermined amount, thereby bringing about the desired predetermined stepping movement of the movable stage 122. Further stepping movements of the movable stage 122 are then brought about by applying further start pulses S to the over-ride circuit 134. It should be understood that, at the end of each stepping movement and prior to the beginning of the next stepping movement, a probe assembly (not shown) can be lowered onto the wafer carried by the movable stage 122, the stage 122 being so positioned that one of the integrated circuits incorporated in the wafer is contacted by the probe assembly so that the external test equipment can perform a test operation on this integrated circuit. The probe assembly is then raised and a further stepping movement of the movable stage 122 brought about so as to bring the next integrated circuit into alignment with the probe assembly, whereupon a test operation on this next integrated circuit is performed.

It should be appreciated that the indexing mechanism described above is inherently capable of great accuracy, and, in particular, no cumulative errors occur therein, such as might occur in known indexing mechanisms which depend on running a motor for a fixed time interval. Moreover, in the mechanism described above, there is no possibility of accidental error such as might occur for example as a result of a mis-count in an indexing mechanism relying on generating a fixed number of pulses for feeding into a stepping motor, or counting pulses generated by a sensing device. Further, the present mechanism is relatively simple compared with known indexing mechanisms and is inherently capable of operating at high speeds since the higher time derivatives of the angular velocity of the shaft 36 are controllable.

If desired, the indexing mechanism may incorporate a fine adjustment whereby the stepping movement may be adjusted more finely. Thus, in a modification of the indexing mechanism described above, this fine adjustment may be provided by arranging that the bearing plate 50 has a variable angle of inclination to the horizontal base 12, the plate 50 being pivotably connected at one end to the base 12 along a pivot line which is horizontal and at right angles to the axis of the shaft 36, and the angle of inclination of the plate 50 being adjustable by means of an adjustment screw. With this arrangement, the imaginary line joining the centres of the first and second gear wheels 68 and 70 makes an angle A with the vertical, and it will be appreciated that this angle will progressively vary in one sense as the bearing post 48 slides along the inclined bearing plate 50 during a translational movement of the assembly of the gear train 68, 70 and 72 and drum 44 and frame 42. It will be understood that if this angle A varies by $x$ degrees for each complete revolution of the second gear wheel 70 then the amount by which the movable stage 122 is caused to move during each indexing step is greater or less (depending on the sense of slope of the bearing plate) than $N/2$ thousandths of an inch by $(N/2) \cdot (x/360)$ thousandths of an inch; this change in amount of movement can be increased or decreased by increasing or decreasing respectively the angle of inclination of the bearing plate. As a further refinement, the bearing surface of the bearing plate may be shaped in such a manner as to compensate for any imperfections in the pitch of the lead-screw 106. In addition, the bearing surface could be raised and lowered automatically by a temperature sensitive device (such as a bimetal strip) in order to take account of the difference in temperature coefficients of expansion between the lead-screw 106 and the semiconductor wafer carried on the movable stage 122; in this way the indexing mechanism can be rendered substantially temperature insensitive.

It should be understood that various other modifications could be made to the indexing mechanism described above without departing from the basic inventive concept embodied therein. For example, in one alternative arrangement, the slots 56 and 58 which are formed in the drum 44 and which constitute the reference marking could be replaced by magnetic marks, and the lamps 60 and 62 and photocells 64 and 66 could be replaced by magnetic transducing heads. In a second alternative arrangement the reference marking could be carried by the second gear wheel; in this case the reference marking could be for example in the form of arcuate slots, with the lamps and photocells disposed on opposite sides of the second gear wheel. In a further alternative arrangement the first gear wheel could be connected to the second gear wheel by a chain band or friction drive; in the case of a friction drive, the gear wheels would not be provided with teeth, and the amount of linear movement of the movable stage per revolution of the second gear wheel would be determined by the relative diameters of the first and second gear wheels. In another modification, the second gear wheel could be replaced by a cluster of gear wheels spaced axially apart and having different numbers of teeth, while the drum could have a plurality of pairs of reference slots also spaced axially apart; in this case the assembly of the gear cluster and drum could be moved axially relative to the frame 42 in order to select a different second gear and to select a different pair of slots for alignment with the lamps and photocells. In another alternative arrangement, the drum could be replaced by a drum of different inertia when the gear ratio of the first and second gear wheels is altered so as to compensate for the change in angular momentum of the drum assembly which would tend to occur in operation following a change in gear ratio. In a still further alternative arrangement, the braking action could be applied to the shaft 36 instead of to the spindle 54, in which case the spline shaft 82 would be dispensed with.

It should be further understood that the application of an indexing mechanism in accordance with the present invention is not restricted to the testing of semiconductor devices. For example, such a mechanism could be utilised in the information retrieval art, the mechanism being used to index a record carrier under an information sensing means.

I claim:
1. An indexing mechanism for linearly moving a workpiece in a series of steps including a rotatable shaft on which is secured a first gear wheel forming part of a gear train, drive means for rotating said shaft, control means including sensing means which is adapted to sense a reference marking formed on a second gear wheel of said gear train or on a member coupled to the second gear wheel for rotation therewith and which is fixed relative to the axis of the second gear wheel, said control means being adapted to stop the rotation of said shaft, in response to the sensing of said reference marking, upon the second gear wheel reaching a predetermined angular position relative to said sensing means, a linearly movable actuating member for moving the workpiece, and means adapted to convert rotational movement of said shaft into linear movement of said actuating member, the arrangement being such that, in operation, the second gear wheel is adapted to undergo intermittent single complete revolutions each corresponding to a predetermined linear movement of said actuating member.

2. An indexing mechanism according to claim 1, wherein the second gear wheel is removable from said gear train so as to be readily replaceable by another gear wheel having a different number of teeth.

3. An indexing mechanism according to claim 2, including means for resiliently urging together the second gear wheel and a co-operating gear wheel of said gear train, these co-operating gear wheels being movable apart so as to facilitate replacement of the second gear wheel by another gear wheel.

4. An indexing mechanism according to claim 1, wherein said means adapted to convert rotational movement of said shaft into linear movement of said actuating member includes inner and outer coaxial co-operating members, the inner member having an external screw thread which engages in an internal screw thread formed in the outer member, one of the two co-operating members being coupled to said shaft for rotation therewith, and the other member being constrained so as to prevent rotation thereof.

5. An indexing mechanism according to claim 4, wherein said means adapted to convert rotational movement includes a thimble-like member the closed end of which is secured to the inner member of said co-operating members and the open end of which surrounds the outer member of said co-operating members, said open end being marked with graduations around its periphery, and said outer member being marked with longitudinal graduations on its outer surface, whereby, in operation, the amount of linear movement of said actuating member can be read off in the manner of a micrometer head.

6. An indexing mechanism according to claim 1, wherein said actuating member is coupled to said shaft for rotation therewith and wherein the workpiece is adapted to be moved, without rotation, under the action of said actuating member, the workpiece being held in contact with said actuating member by magnetic attraction in such a manner as to permit rotation of said actuating member relative to the workpiece.

7. An indexing mechanism according to claim 1, including clutch means operative to couple said shaft to a continuously rotating driving means so as to bring about rotation of said shaft, and brake means operative to apply a braking action to said shaft, said control means being adapted, in response to the sensing of said reference marking, to render the clutch means inoperative and the brake means operative in order to stop the rotation of said shaft.

8. An indexing mechanism according to claim 7, wherein said reference marking is formed by first and second reference marks, and wherein said sensing means is formed by first and second sensing members which are respectively adapted to sense said first and second reference marks, said first sensing member being adapted to control the operation of the brake means, and said second sensing member being adapted to control the operation of the clutch means.

9. An indexing mechanism according to claim 8, wherein the arrangement of said first and second reference marks is such that, in operation, the clutch means is rendered inoperative prior to the rotation of said shaft being stopped under the action of the brake means.

10. An indexing mechanism according to claim 8, wherein the configuration of said first reference mark is such that, in operation, the braking action applied to said shaft by the brake means commences prior to the rotation of said shaft actually stopping, the arrangement being such that a suddenly increased braking force is applied at the end of the braking action so as to bring the rotation of said shaft to an abrupt stop.

11. An indexing mechanism according to claim 8, wherein said reference marks are formed by slots in a rotatable carrier, and wherein said first and second sensing members are formed by photoelectric devices adapted to sense light transmitted through said slots.

12. An indexing mechanism according to claim 11, wherein said carrier is formed by a drum coupled to the second gear wheel for rotation therewith, and wherein said slots are formed in the circumference of the drum, the photoelectric devices being respectively adapted to receive light from two electric lamps transmitted through said slots.

13. An indexing mechanism according to claim 8, wherein said first and second sensing members are respectively connected to energizing solenoids for the brake means and clutch means via two amplifiers, and wherein said control means includes an over-ride circuit coupled to said amplifiers, the arrangement being such that, in order to cause said shaft to commence to rotate, the over-ride circuit causes the clutch solenoid to be energized and the brake solenoid to be de-energized.

14. An indexing mechanism according to claim 7, wherein said shaft and said gear train are linearly movable relative to the clutch means and brake means, and wherein said shaft and said second gear wheel are coupled to the clutch means and brake means via at least one spline shaft which permits such relative movement.

15. An indexing mechanism according to claim 1, wherein said second gear wheel is carried on a frame which is pivotably mounted on said shaft and which is adapted to move linearly together with said shaft and said actuating member, a portion of said frame spaced from said shaft bearing on a bearing surface mounted on a support for the indexing mechanism.

16. An indexing mechanism according to claim 15, wherein said bearing surface has a variable angle of inclination to the horizontal, whereby the amount of a stepping movement of the workpiece may be varied.

References Cited

UNITED STATES PATENTS 2,915,160  12/1959  Schneider _____ 192—33 XR

GERALD M. FORLENZA, Primary Examiner

F. E. WERNER, Assistant Examiner

U.S. Cl. X.R.

74—84; 192—15, 33